United States Patent Office 3,557,138
Patented Jan. 19, 1971

3,557,138
3-NITROIMIDAZO-[2,1:a]-ISOINDOLES
Lewis H. Sarett, Princeton, Dale R. Hoff, Cranford, and David W. Henry, Plainfield, N.J., assignors to Merck & Co., Inc., Rahway, N.J., a corporation of New Jersey
No Drawing. Continuation of application Ser. No. 724,650, Feb. 2, 1968, which is a division of application Ser. No. 350,639, Mar. 10, 1964, now Patent No. 3,399,211, dated Aug. 27, 1968. This application July 29, 1969, Ser. No. 848,405
Int. Cl. C07d 49/36
U.S. Cl. 260—309    7 Claims

ABSTRACT OF THE DISCLOSURE

Nitroimidazoisoindoles prepared by treating a 2-(carboxyphenyl)-5-nitroimidazole with a reducing agent to obtain the corresponding 2-(hydroxymethylphenyl)-5-nitroimidazole, treating the latter compound with a halogenating agent to obtain the corresponding 2-(halomethylphenyl)-5-nitroimidazole and heating the latter compound. The nitroimidazoisoindoles are effective for the control of protozoal diseases.

---

This is a continuation of application Ser. No. 724,650, filed Feb. 2, 1968 and now abandoned, which in turn is a division of application Ser. No. 350,639, filed Mar. 10, 1964, now issued to patent as U.S. Pat. No. 3,399,211, issued Aug. 27, 1968.

This invention relates generally to new imidazoles and more particularly to new 2-aryl nitroimidazoles and to methods for their preparation. Still more specifically, it is concerned with 1-substituted-2-aryl-5-nitroimidazoles, 1-substituted-2-aryl-4-nitroimidazoles, and structurally related isoindoles and dihydroisoquinolines, with the chemical synthesis of these new heterocyclic compounds, with compositions containing such compounds, and with the use of such compounds and compositions as parasiticides. More particularly, the invention is concerned with 1-substituted-2-aryl-5-nitroimidazoles, 1 - substituted-2-aryl-4-nitroimidazoles, and related isoindoles and dihydroisoquinolines and their use as antiprotozoals. The invention is further concerned with novel nitroimidazoles useful as intermediates in the preparation of the active parasiticides and with methods for their preparation.

Histomoniasis is a poultry disease due to the protozoan parasite *Histomonas meleagridis*. This disease, also known as turkey blackhead or enterohepatitis, is a serious economic problem in the turkey-raising industry. The infestation frequently spreads rapidly in turkey flocks and high mortality rates due to the disease are common. The compounds now commercially available for treating turkey blackhead are somewhat beneficial, but none have proven entirely satisfactory because they permit development of resistant strains of the infecting organism or lead to undesired side effects when ingested by the birds in quantities sufficient to treat the disease.

The protozoan disease trichomoniasis caused by *T. vaginalis* primarily infests the human vagina and is the etiological agent of a very troublesome and prevalent form of vaginal infestation known as *T. vaginalis* vaginitis. Drugs heretofore available for treating this condition like those used for treating enterohepatitis have certain limitations and disadvantages.

One object of the present invention is to provide a new class of chemical compounds which have a high degree of antiprotozoal activity. Another object is to provide new 1-substituted-2-aryl-5-nitroimidazoles, 1-substituted-2-aryl-4-nitroimidazoles, and structurally related isoindoles and dihydroisoquinolines. A further object is to provide processes for the preparation of the novel compounds. Still another object is the provision of new nitroimidazoles which are intermediates in the synthesis of such compounds. A further object is provision of processes for the preparation of these intermediates. A still further object is provision of antitrichomonal and antihistomonal compositions containing the novel compounds of this invention as active ingredients thereof. Further objects will become clear from the following description of the invention.

According to this invention, it has now been found that certain 1-substituted-2-aryl-5-nitroimidazoles and 1-substituted-2-aryl-4-nitroimidazoles are highly effective parasiticides. Generally, the 1-substituted-2-aryl-5-nitroimidazoles are more effective parisiticides than the corresponding 1-substituted-2-aryl-4-nitroimidazoles, but both types of nitroimidazoles are particularly effective against the parasites causing histomoniasis and trichomoniasis. An important feature of the compounds of this invention is that the substituent attached to the 2-position on the imidazole moiety of the active compounds be an aryl group. The aryl substituent may be unsubstituted or substituted at one or more of the positions on the ring. Ortho, meta and para substitution and combinations thereof are contemplated by the present invention. Hereafter, when the term aryl is used in referring to a substituent on the 2-position of the imidazole moiety such term is intended to embrace substituted aryl radicals, i.e. those having attached to the aryl nucleus groups other than hydrogen.

The novel 2-aryl-nitroimidazoles of this invention may be represented by the structural formula

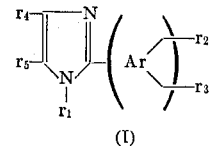

(I)

where Ar is aryl; $r_1$ is hydrogen, loweralkyl or $$-(CH_2)_n X$$

where $n$ has a value of 2–4 and X is halo, hydroxy or loweralkoxy; and $r_2$ is hydrogen, nitro, halo, carboxamido, sulfonamido, amino or lower alkoxy.

The symbol $r_3$ represents hydrogen, lower alkyl, carboxy, aryl, halo, hydroxy, amino, loweralkylamino, diloweralkylamino, nitro, sulfonamido, loweralkylsulfonamido, loweralkoxy, loweralkylthio, cyano, carboxamido, loweralkylcarboxamido, diloweralkylcarboxamido, formyl, loweralkanoyl, acylaminoloweralkyl, loweralkylaminoloweralkyl, diloweralkylaminoloweralkyl, N'-morpholinoloweralkyl, N'-piperidinoloweralkyl, N'-pyrrolidinoloweralkyl, hydroxyloweralkyl, loweralkoxyiminocarbonyl, amidino, loweralkylamidino, diloweralkylamidino, carboxyhydrazido, loweralkoxycarbonyl or loweralkylsulfonyl; and $r_4$ and $r_5$ are hydrogen or nitro, provided that one and only one of $r_4$ and $r_5$ is nitro.

Ar in the formula represented by I above preferably represents a phenyl or naphthyl substituent. $r_1$ may be loweralkyl such as methyl, ethyl, propyl, isopropyl, butyl and the like, or it may be a radical represented by $-(CH_2)_n X$, where X is hydroxy, loweralkoxy such as methoxy, ethoxy, propoxy and the like, or halo such as chloro, fluoro, iodo or bromo. In addition to $r_1$ being a loweralkyl group therefore it may also be hydroxyethyl, hydroxypropyl and the like, methoxymethyl, methoxyethyl, methoxypropyl, ethoxyethyl, ethoxypropyl, propoxyethyl and the like, or 2-chloroethyl, 2-fluoroethyl, 2-bromoethyl, 3-fluoropropyl, 3-iodopropyl, 3-chloropropyl and the like. Halo at the $r_2$ position may be chloro, fluoro, bromo or iodo whereas lower alkoxy may be methoxy, ethoxy, propoxy and the like.

The groups represented by $r_3$ are aryl such as phenyl or naphthyl and the like, halo such as fluoro, chloro, bromo and iodo, loweralkylamino such as methylamino, ethylamino, propylamino and the like, and diloweralkylamino such as dimethylamino, diethylamino, methylethylamino and the like. Also included among the substituents which may be represented by $r_3$ are loweralkylsulfonamido such as methylsulfonamido, ethylsulfonamido and the like, diloweralkylsulfonamido such as dimethylsulfonamido, diethylsulfonamido and the like, loweralkylcarboxamido such as methylcarboxamido, ethylcarboxamido, propylcarboxamido, isopropylcarboxamido and the like, and diloweralkylcarboxamido such as dimethylcarboxamido, diethylcarboxamido, methylethylcarboxamido and the like. There may also be found at this position loweralkanoyl such as acetyl, propionyl, and the like, loweralkyl such as methyl, ethyl, propyl, isopropyl, butyl, propyl and the like, loweralkylaminoloweralkyl such as methylaminomethyl, methylaminoethyl, methylaminopropyl, ethylaminoethyl and the like, diloweralkylaminomethyl such as dimethylaminomethyl, dimethylaminoethyl, methylethylaminomethyl, dimethylaminoethyl and the like, N-morpholinoloweralkyl such as N-morpholinomethyl, N-morpholinoethyl and the like, N-piperidinoloweralkyl such as N-piperidinomethyl, N-piperidinoethyl and the like, N-pyrrolidinoloweralkyl such as N-pyrrolidinomethyl, N-pyrrolidinoethyl and the like, hydroxyethyl, hydroxypropyl and the like, and loweralkylsulfonyl such as methylsulfonyl, ethylsulfonyl and the like. $r_3$ may also be loweralkoxy such as methoxy, ethoxy, propoxy and the like, loweralkylthio such as methylthio, ethylthio and the like, acylamino such as loweralkanoylamino, preferably acetylamino, propionylamino and the like, aroylamino, preferably benzoylamino and the like, and aralkanoylamino, preferably phenylacetylamino and the like, and $r_3$ also represents loweralkoxycarbonyl such as methoxycarbonyl, ethoxycarbonyl, propoxycarbonyl, isopropoxycarbonyl and the like. Other substituents which may be located on the aryl substituent of the compounds of Formula I are loweralkoxy-iminocarbonyl such as methoxyiminocarbonyl, ethoxyiminocarbonyl and the like, loweralkylamidino such as methylamidino, ethylamidino and the like, diloweralkylamidino such as dimethylamidino, diethylamidino, methylethylamidino and the like, and similar substituents.

It should be understood that the 1-unsubstituted nitroimidazoles discussed herein are compounds in which the nitro substituent is at either the 4 or 5 position on the imidazole nucleus. The hydrogen atom on a nitrogen in the imidazole ring is in the state of tautometric equilibrium and the result is an imidazole in which the 4 and 5 positions are equivalent. For convenience, these compounds are herein designated 4-nitroimidazoles.

In accordance with this invention, one method for preparing the novel 1-loweralkyl-2-aryl-5-nitroimidazoles described herein is depicted in the following flow diagram. $r_2$ and $r_3$ are as hereinabove defined and $r_6$ is loweralkyl.

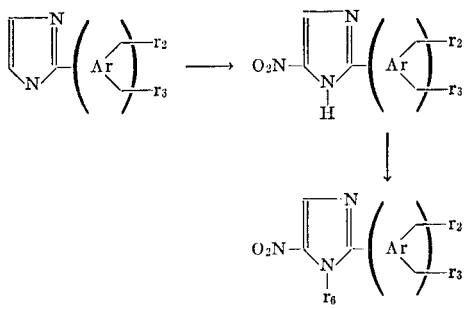

An important feature of the present invention is concerned with the manner of nitrating the 2-aryl imidazole starting compounds. Selective introduction of a nitro substituent on to the imidazole moiety and substantial elimination of aryl radical nitration is usually desired. Certain reactants and reaction conditions have been found desirable in nitrating the starting compounds in the manner preferred. When nitration of a 2-aryl imidazole is carried out on a compound having an electro negative group on the aryl moiety thereof, it has been found that the use of concentrated nitric acid in sufuric acid solvent affords a compound substituted only on the imidazle ring. For example, nitration using sufuric and nitric acids produce a nitrosubstituted imidazole when a chloro, nitro or carboxamido substituent is affixed to the aryl radical of the starting aryl imidazole. Depending upon the particular reactants employed, reaction temperatures of the nitration may vary from about room temperature of a temperature as high as the reflux temperature of the acid mixture (about 150–160° C.). The reaction is normally completed in less than an hour and a 20 to 30 minute reaction time is often found to be sufficient. Temperature and reaction time are not critical when preparing these compounds according to the method described and it is only generally desirable to heat the reaction mixture in order that the rate of reaction be conveniently increased. When the formation of the desired nitroimidazole is complete, the product may be isolated and purified by known method such as by filtration, extraction, removal of solvent under reduced pressure and crystallization of the residual heterocyclic compound.

The compounds which may be prepared according to the foregoing nitration procedure may be represented by the formula

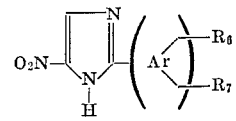

where Ar is aryl; $R_6$ is hydrogen, nitro, carboxamido, sulfonamido or amino; and $R_7$ is carboxyl, amino, loweralkylamino, diloweralkylamino, nitro, sulfonamido, loweralkylsulfonamido, diloweralkylsulfonamido, cyano, carboxamido, loweralkylcarboxamido, diloweralkylcarboxamido, formyl, loweralkanoyl, carboxhydrazido, loweralkoxycarbonyl or loweralkylsulfonyl.

When in particular instances it is desired that nitration be effected on both the aryl and imidazole moieties, the use of concentrated sulfuric acid and concentrated nitric acid are employed. The reaction condition are similar to those used when nitrating only the imidazole moiety exept that at least 2 moles of nitric acid per mole of imidazole is utilized. For example, when 2-phenyl imidazole is treated with sufficient nitric and sulfuric acids, 2-(4′-nitrophenyl)-4-nitroimidazole results.

When a lower alkanoic acid or an anhydride thereof, such as acetic acid, propionic acid, butyric acid, acetic anhydride, propionic anhydride, butyric anhydride and the like is used in place of sulfuric acid as reaction medium in the above-described nitration reaction, those compounds, the aryl moiety of which would otherwise be nitrated, are selectively nitrated on the imidazole ring. Accordingly, the above-mentioned organic acids and anhydrides may be utilized when sulfuric acid as nitration solvent permits nitro substitution on the aryl moiety of the 2-aryl imidazole starting compounds. This change in reaction media permits a surprising degree of control over introduction of the nitro substituent to the imidazole ring. Substantially the same reaction conditions as those desired for the sulfuric acid medium are preferred. The tendency of a nitro group to attach to the imidazole rather than the aryl moiety is consequently effectively increased by the use of loweralkyl carboxylic acids or anhydrides thereof as solvents during nitration. It has been found that the organic compounds particularly useful as selective nitration solvents are acetic acid and acetic anhydride.

The compounds which may be prepared according to the above nitration procedure in which a lower alkanoic acid or a lower alkanoic anhydride is used as reaction medium may be represented by the formula

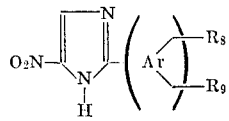

where Ar is aryl; $R_8$ is hydrogen, halo, carboxamido, nitro or loweralkoxy; and $R_9$ is hydrogen, loweralkyl, carboxy, aryl, halo, hydroxy, diloweralkylamino, nitro, diloweralkylsulfonamido, loweralkoxy, loweralkylthio, cyano, carboxamido, loweralkylcarboxamido, diloweralkylcarboxamido, formyl, loweralkanoyl, acylaminoloweralkyl, diloweralkylaminoloweralkyl, N' - morpholinoloweralkyl, N'-piperidinoloweralkyl, N'-pyrrolidinoloweralkyl, loweralkoxycarbonyl or loweralkylsulfonyl.

According to an additional aspect of the invention, nitronium perchlorate and certain nitronium metal fluorides have been found useful as nitrating agents in that they too cause nitro addition on the imidazole moiety in preference to the aryl ring. Nitronium salts comprising anions in a high oxidation state such as nitronium tetrafluoroborate, nitronium hexafluorophosphate, nitronium hexafluoroarsenate, nitronium hexafluorosilicate, nitronium hexafluoroantimonate, nitronium perchlorate and the like, preferably nitronium tetrafluoroborate, are useful for this purpose. The use of an inert solvent to bring the imidazole into solution is preferred. Solvents such as acetonitrile, chloroform, nitromethane, dichloroethane, tetramethylenesulfone and the like are suitable for this purpose. The nitration may be conducted at temperatures between about 0° C. and room temperature and above, preferably at about 10–20° C.

According to the present invention, it has now been found that 2-sulfonamidoaryl-4-nitroimidazole is prepared from 2-aryl-4-nitroimidazole by treating the latter with chlorosulfonic acid at a temperature preferably above room temperature for a time greater than about 24 hours. The crude reaction product is then treated with a source of ammonia, at a temperature of about −30° C. to about 100° C. preferably about 0° C. to about 10° C. to obtain the desired 2-sulfonamidoaryl-4-nitroimidazole. Ammonium hydroxide, anhydrous ammonia and the like, preferably ammonium hydroxide are useful to supply the necessary ammonia. The use of loweralkyl substituted amines, e.g. dimethylamine, in place of an ammonia source give the corresponding N'-loweralkyl or N',N'-diloweralkyl-2-sulfonamidoaryl-4-nitroimidazole.

When the preparation of 2-(aminoaryl)-4-nitroimidazole is undertaken, the compound may be prepared from 2-(nitroaryl)-4-nitroimidazole by treatment with hydrogen sulfide and ammonia. The reaction temperature is not critical but a reaction temperature above about 50° C. is preferred to reduce reaction time. The reaction mixture is then acidified by convenient means preferably by addition of a strong mineral acid such as hydrochloric acid. The sulfur precipitate is then removed by filtration and the product is extracted by conventional means such as by use of insert organic solvent such as ethyl acetate. When this product is to be substituted at the 1-position, the usual practice of protecting an amino group by acylation is carried out. The 1-substituted-2-(aminoaryl) nitroimidazole is then conveniently obtained by hydrolyzing the acylated aminoaryl compound with a mineral acid such as hydrochloric acid.

The 2-aryl imidazoles employed as starting materials in the present invention may be prepared according to synthetic methods presently known in the literature. One method for preparing these compounds involves reaction of an appropriately substituted aromatic nitrile such as benzonitrile with a loweralkanol and a strong mineral acid. This reaction is preferably conducted at about 0–10° C. for up to about 14 days depending on the reactants used. The resulting product, a loweralkyl aryl imidate hydrochloride, is then treated with an amino acetaldehyde acetal in a suitable solvent, preferably a loweralkanol such as methanol at temperatures ranging from about 0° C. to room temperature. These temperatures are determined according to the particular reactants used. This reaction may be generally represented as follows:

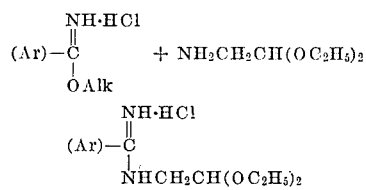

Treatment of the resulting amidine with acid such as a concentrated mineral acid and then with a base such as a lower alkali or a lower alkaline earth metal hydroxide produces the 2-aryl imidazole desired.

As an additional aspect of the invention, it has now been found that compounds having the general Formula II below are prepared from aromatic starting materials having two ortho positioned cyano groups.

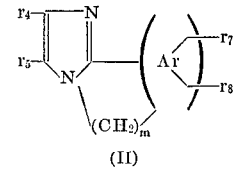

(II)

The symbol $m$ in the formula has a value of 1–2, $r_4$ and $r_5$ are hydrogen or nitro, provided that one and only one of $r_4$ and $r_5$ is nitro; $r_7$ is hydrogen, nitro, halo, carbamoyl carboxamido, sulfamoyl, amino or loweralkoxy; and $r_8$ is hydrogen, carboxy, aryl, halo, hydroxy, loweralkylamino, diloweralkylamino, nitro, sulfamoyl, loweralkylsulfamoyl, diloweralkylsulfamoyl, cyano, carbamoyl, loweralkylcarbamoyl, diloweralkylcarbamoyl, formyl, loweralkanoyl, loweralkyl, loweralkylaminoloweralkyl, diloweralkylaminoloweralkyl, N'-morpholinoloweralkyl, N'-piperidinoloweralkyl, N'-pyrrolidinoloweralkyl, hydroxyloweralkyl or loweralkylsulfonyl.

The first step in preparing the above compounds involves reaction with a loweralkanol and hydrogen chloride. The reaction is preferably conducted at about 0–10° C. The resulting product is a loweralkyl o-cyanoaryl imidate hydrochloride which is then treated with amino acetal in solvent, preferably a loweralkanol such as methanol. The temperature is not critical but room temperature is preferred. The resulting o-cyanoaryl amidine is then converted to the corresponding 2-(o-carboxyaryl) imidazole by treatment with a strong acid, preferably concentrated mineral acid such as sulfuric acid. This product is then nitrated on the imidazole ring using a nitrating agent such as fuming nitric acid in a mineral acid, preferably sulfuric acid. The process conditions are like those previously described for the nitric acid-sulfuric acid nitration. The carboxylic acid on the substituent is then reduced to hydroxymethyl by the use of a selective reducing agent such as diborane. Treatment of the 2-(2'-hydroxymethylaryl)-4-nitroimidazole product with a halogenating agent such as thionyl chloride produces a 2-(2'-halomethylaryl)-4- nitroimidazole which is then converted to the desired isoindole by heating at about 100° C. to 160° C. for about 1 to 30 minutes. Addtion of a cyano substituent to the 2-halomethylaryl nitroimidazole intermediate according to procedures established in the art and further treatment according to the method above described produces 2-(2'-haloethylaryl)-4-nitroimidazole which upon cyclization gives a corresponding dihydroisoquinoline.

As illustrative of some of the isoindoles and dihydroisoquinolines preparable according to the above procedure, there may be mentioned 3-nitro-7(or 8)-fluoroimidazo-[2,1:a]-isoindole,
3-nitro-7(or 8)-chloroimidazo-[2,1:a]-isoindole,
3,7(or 8)-dinitroimidazo-[2,1:a]-isoindole,
3-nitroimidazo-[2,1:a]-isoindole,
3-nitro-7(or 8)-carboxamidoimidazo-[2,1:a]-isoindole,
3-nitro-7(or 8)-formylimidazo-[2,1:a]-isoindole,
3-nitro-7(or 8)-methylimidazo-[2,1:a]-isoindole,
3-nitro-7(or 8)-sulfonamidoimidazo-[2,1:a]-isoindole,
3-nitro-5,6-dihydroimidazo-[2,1:a]-isoquinoline,
3-nitro-5,6-dihydro-8(or 9)-fluoroimidazo-[2,1:a]-isoquinoline,
3-nitro-5,6-dihydro-8(or 9)-nitroimidazo-[2,1:a]-isoquinoline and
3-nitro-5,6-dihydro-8(or 9)-phenylimidazo-[2,1:a]-isoquinoline.

The 1 - substituted - 2-aryl-5-nitroimidazoles, 1-substituted-2-aryl-4-nitroimidazoles, and structurally related isoindoles and dihydroisoquinolines of this invention are effective in the control of enteroheptatitis in turkeys. For this purpose they may be administered to turkeys mixed with an element of turkey sustenance, e.g. feed or drinking water. Good control of the disease is obtained when the imidazole compounds of the invention are incorporated in a turkey feed ration at levels of from about 0.003% to about 0.1% by weight and preferably from about 0.006% to 0.05% by weight of the feed. The optimum concentration will depend to a large extent on the age of the birds, the severity of the infection and the particular compound employed. With these feed levels good control of the disease is obtained with no or minimal side effects or growth retardation of the turkeys.

When the poultry feed or poultry ration is employed as carrier for the active compounds of the present invention, it is desired that the drug be uniformly mixed throughout the feed. This may be accomplished by first preparing a premix or feed supplement composition wherein the active ingredient is present in concentrations of rfom about 1% to about 50% by weight and where the carrier or diluent is a nontoxic orally ingestible carrier. It is preferred that the carrier be a nutritive one, for example corn distillers dried grains, corn gluten feed, corn cob meal, edible vegetable substances, condensed fish solubles, brewers yeast, whey, alfalfa, citrus meal, molasses solubles, soybean mill feed, antibiotic mycelia, toasted dehulled soya flour, soya grits, wheat shorts, wheat middlings, soybean meal, fermentation residues or corn meal. The supplements or premixed are then intimately and uniformly mixed with the remainder of the poultry ration by conventional techniques such as grinding or milling.

When the active compounds are administered by way of drinking water of the poultry which method is preferred when the birds are severely infected (the birds will normally continue to drink after they have stopped eating solid food), somewhat higher dose levels are employed than when administered with solid feed. The quantities of active agent which are useful are those in which from about 0.01% to about 0.1% by weight of water are utilized. Some of the nitroimidazoles of the invention are not highly water soluble and when compounds are added to drinking water it is desirable that suspending or emulsifying agents also be used to render the compound more effective in such form. A water soluble form of the drug may be utilized in a similar fashion.

The feed levels at which representative members of the compounds of the invention are active in controlling histomoniasis in turkeys are as follows:

| Compound: | Percent by weight in feed |
|---|---|
| 1-methyl-2-phenyl-5-nitroimidazole | .025 |
| 1-methyl-2-(2'-nitrophenyl)-5-nitroimidazole | .0125 |
| 1-methyl-2-(3'-nitrophenyl)-5-nitroimidazole | .0125 |
| 1-methyl-2-(4'-nitrophenyl)-5-nitroimidazole | .006 |
| 1-methyl-2-(4'-chlorophenyl)-5-nitroimidazole | .025 |
| 1-methyl-2-(4'-aminophenyl)-5-nitroimidazole | .025 |
| 1-methyl-2-(3'-sulfonamidophenyl)-5-nitroimidazole | .025 |
| 1-methyl-2-(4'-fluorophenyl)-5-nitroimidazole | .006 |
| 1-methyl-2-(3',5'-dinitrophenyl)-5-nitroimidazole | .025 |

As previously stated, the 1-substituted-2-aryl-5-nitroimidazoles, 1-substituted-2-aryl-4-nitroimidazoles, and structurally related isoindoles and dihydroisoquinolines described herein also have a significant degree of antitrichomonal activilty. When employed in treating trichomoniasis, they may be administered orally in unit dosage form, for instance as tablets or capsules. Such unit dosage forms containing from about 100 to about 500 mg. of active antitrichomonal ingredient are quite satisfactory and are prepared by techniques known to those skilled in the pharmaceutical art. Thus, these unit dosage forms will contain the normal diluents, excipients, lubricating agents and extenders regularly employed in compounding such forms.

Alternatively, the drugs may be suspended or dissolved in liquid vehicles designed for oral administration. The final preparation may be in the form of a solution, emulsion, suspension, syrup or the like and may be adapted for ultimate use by known methods with conventional excipients, diluents, wetting agents or other additives.

The 1-substituted-2-aryl-5 (or 4)-nitroimidazoles of the present invention are also useful as topical trichomonacides. When employing the compounds in this manner, one or more of the active agents are uniformly distributed in a suitable chemotherapeutic vehicle that is chemically compatible with the particular compound selected, noninhibiting with respect to the action of the effective agent upon *Trichomonas vaginalis* and essentially noninjurious to body tissue under the conditions of use. The vehicle is preferably a semi-liquid or semi-solid type and the final preparation may be in the form of a suppository, if desired.

Oil and water types of emulsions or creams as well as aqueous jellies such as those prepared with the aid of any of a number of commercially used jelling agents including acacia, tragacanth, bentonite, alginic acid and the like are suitable vehicles. The vehicle may also be a viscous aqueous jell containing one or more cellulose derivatives such as methyl cellulose, hydroxyethyl cellulose, and sodium carboxy methyl cellulose. Jelling agents such as pectin, gum tragacanth, sodium alginate and other vegetable jelling agents are also useful vehicles in this regard.

The compounds preferred for use against *T. vaginalis* vaginitis are set forth below. The activity indicated is that displayed in vivo in mice infested with the protozoal infection. Activity is expressed in terms of mg./kg. as determined by the method described in Cuckler, Kupferberg and Millman, "Chemotherapeutic and Tolerance Studies on Amino-nitro Thiazoles," Antibiotics & Chemotherapy, 10, 540–550, 1955.

| Compound: | Activity (mg./kg.) |
|---|---|
| 1-methyl-2-phenyl-5-nitroimidazole | 40 |
| 1-methyl-2-(2'-nitrophenyl)-5-nitroimidazole | 10 |
| 1-methyl-2-(3'-nitrophenyl)-5-nitroimidazole | 10 |
| 1-methyl-2-(4'-nitrophenyl)-5-nitroimidazole | 20 |
| 1-methyl-2-(4'-chlorophenyl)-5-nitroimidazole | 20 |
| 1-methyl-2-(4'-aminophenyl)-5-nitroimidazole | 60 |
| 1-methyl-2-(3'-sulfonamidophenyl)-5-nitroimidazole | 40 |
| 1,N',N'-trimethyl-2-(4'-sulfonamidophenyl)-5-nitroimidazole | 40 |
| 1-methyl-2-(2',4'-dinitrophenyl)-5-nitroimidazole | 100 |
| 1-methyl-2-(4'-fluorophenyl)-5-nitroimidazole | 5 |
| 1-methyl-2-(4'-carboxamidophenyl)-5-nitroimidazole | 40 |
| 1-methyl-2-(3',4'-dichlorophenyl)-5-nitroimidazole | 33 |
| 1-(2'-hydroxyethyl)-2-(4'-fluorophenyl)-5-nitroimidazole | 10 |
| 1-methyl-2-(4'-fluorophenyl)-4-nitroimidazole | 10 |
| 3-nitroimidazo-[2,1:a]-isoindole | 20 |
| 3,7 (or 8)-dinitroimidazo-[2,1:a]-isoindole | 20 |

The following examples are given for the purpose of illustration and not by way of limitation.

EXAMPLE 1

3-nitroimidazo-[2,1:a]-isoindole

A mixture of 70 gm. phthalonitrile, 100 ml. absolute ethanol and 200 ml. chloroform is saturated with dry hydrogen chloride while being stirred in an ice bath. The mixture is kept 14 days at 0° C. and is then filtered and the product, ethyl o-cyanobenzimidate hydrochloride is washed with chloroform. The mother liquors are diluted with ether until precipitation takes place and the precipitate is filtered off and added to the first crop.

136 gm. of crude ethyl o-cyanobenzimidate hydrochloride and 95 ml. amino acetaldehyde diethyl acetal is dissolved in 1 l. of methanol and the solution is allowed to stand at room temperature for one hour. The solvent is removed in vacuo and the syrupy residue is heated 1½ hours on the steam bath with 400 ml. concentrated sulfuric acid. The mixture is cooled, diluted with 2.5 l. water and extracted with chloroform. The acidic solution is made strongly basic by addition of a 5% excess of 34% sodium hydroxide. The solution is then extracted with chloroform. The chloroform extracts are discarded and the basic solution is brought to pH 5 with concentrated hydrochloric acid and evaporated to dryness in vacuo. The residual brown salts are heated at 210–220° C. for 3–4 hours at 1 mm. pressure in a sublimation apparatus. The resulting sublimate is dissolved in 200 ml. of warm 1.25 N hydrochloric acid. The solution is then cooled and the insoluble precipitate is filtered off. The filtrate is evaporated to dryness and the resulting salts are dissolved in 400 ml. of warm absolute ethanol. After cooling, a precipitate of ammonium chloride is filtered off and the filtrate boiled down to 150–200 ml. On cooling, a further crop of ammonium chloride is removed by filtration. A major portion of the ethanol is evaporated and the syrupy residue is diluted with 200 ml. of acetone to cause precipitation of 2-(2'-carboxyphenyl) imidazole hydrochloride.

1.00 gm. of this product is dissolved in 3.0 ml. of 30% fuming sulfuric acid and .50 ml. fuming nitric acid (10.8 mmol) is added over about one minute below the surface of the solution. The mixture is heated on the steam bath for about 15 minutes and then cooled, diluted with 30 ml. water and treated with 10 ml. 11.7 N sodium hydroxide solution with further cooling at 0° C. The product is filtered off and recrystallized from acetone-water to give 2-(2'-carboxyphenyl)-4-nitroimidazole.

Into a suspension of .500 gm. (2.13 mmol) of 2-(2'-carboxyphenyl)-4-nitroimidazole in 5.0 ml. di($\beta$-methoxyethyl) ether is passed a slow stream of diborane until all of the starting material dissolves. The mixture is allowed to stand at room temperature for one hour and the nearly solid mixture resulting is then diluted carefully with 20 ml. of water. The mixture is then cooled on ice and the precipitate, 2-(2'-hydroxymethylphenyl)-4-nitroimidazole, is filtered off and washed with water.

303 mg. (1.38 mmol) of 2-(2'-hydroxymethylphenyl)-4-nitroimidazole is treated with 1 ml. thionyl chloride. The excess of thionyl chloride is removed in vacuo and the residue is dissolved in 1 ml. of methanol. The solution is then diluted with 5 ml. water and the precipitated oil is extracted with two portions of chloroform. After drying over sodium sulfate and evaporation in vacuo a readily crystalline brown residue of 2-(2'-chloromethylphenyl)-4-nitroimidazole is obtained. This is purified by filtering over 4.0 gm. acid-washed alumina in ethyl acetate solvent.

1.21 gm. (5.10 mmol) of the above obtained nitroimidazole is heated for 2–3 minutes at 152° C. The dark residue is then dissolved in a mixture of chloroform and excess dilute sodium hydroxide solution. The chloroform phase is combined with two further chloroform extracts and is evaporated to dryness. The brown residue is chromatographed over 6.0 gm. acid-washed alumina using a 1:1 volume ratio of methylene chloride and ether as eluent. The pale yellow band which is eluted after a brief period is collected in one fraction and the solvent is evaporated to dryness. Rescrystallization from methylene chloride gives 3-nitroimidazo-[2,1:a]-isoindole; M.P. 212–214° C.

When 1,2-dicyano-4-fluorobenzene,
1,2-dicyano-4-formylbenzene,
1,2-dicyano-4-carboxamidobenzene,
1,2-dicyano-4-sulfonamidobenzene,
1,2-dicyano-4-chlorobenzene,
3,4-dicyanobiphenyl,
1,2-dicyano-4-acetylbenzene,
1,2-dicyano-4-acetylaminomethylbenzene,
1,2-dicyano-N-methyl-4-carboxamidobenzene,
1,2-dicyano-N,N-dimethyl-4-carboxamidobenzene,
1,2-dicyano-N-methyl-4-sulfonamidobenzene,
1,2-dicyano-N,N-dimethyl-4-sulfonamidobenzene,
1,2-dicyano-N-methyl-4-aminomethylbenzene,
1,2-dicyano-N,N-dimethyl-4-aminomethylbenzene,
1,2-dicyano-4-morpholinomethylbenzene,
1,2-dicyano-4-pyrrolidinomethylbenzene,
1,2-dicyano-4-piperadinomethylbenzene,
1,2-dicyano-4-hydroxymethylbenzene,
1,2-dicyano-4-methylsulfonylbenzene or
1,2-dicyano-4-trifluoromethylbenzene is used in place of phthalonitrile in the above process, there is obtained 3-nitro-7(or 8)-fluoroimidazo-[2,1:a]-isoindole,
3-nitro-7(or 8)-formylimidazo-[2,1:a]-isoindole,
3-nitro-7(or 8)-carboxamidoimidazo-[2,1:a]-isoindole,
3-nitro-7(or 8)-sulfonamidoimidazo-[2,1:a]-isoindole,
3-nitro-7(or 8)-chloroimidazo-[2,1:a]-isoindole,
3-nitro-7(or 8)-phenylimidazo-[2,1:a]-isoindole,
3-nitro-7(or 8)-acetylimidazo-[2,1:a]-isoindole,
3-nitro-7(or 8)-acetylaminomethylimidazo-[2,1:a]-isoindole,
3-nitro-7(or 8)-N-methylcarboxamidoimidazo-[2,1:a]-isoindole,
3-nitro-7(or 8)-N,N-dimethylcarboxamidoimidazo-[2,1:a]-isoindole,
3-nitro-7(or 8)-N-methylsulfonamidoimidazo-[2,1:a]-isoindole, 3-nitro-7(or 8)-N,N-dimethylsulfonamidoimidazo-[2,1:a]-isoindole,
3-nitro-7(or 8)-N-methylaminomethylimidazo-[2,1:a]-isoindole,
3-nitro-7(or 8)-N,N-dimethylaminomethylimidazo-[2,1:a]-isoindole,
3-nitro-7(or 8)-morpholinomethylimidazo[2,1:a]-isoindole,
3-nitro-7(or 8)-pyrrolidinomethylimidazo-[2,1:a]-isoindole,
3-nitro-7(or 8)-piperadinomethylimidazo-[2,1:a]-isoindole,
3-nitro-7(or 8)-hydroxymethylimidazo-[2,1:a]-isoindole,
3-nitro-7(or 8)-methylsulfonylimidazo-[2,1:a]-isoindole or
3-nitro-7(or 8)-trifluoromethylimidazo-[2,1:a]isoindole.

When 3,4-dicyanotoluene is used in place of phthalonitrile in the process described in the first two paragraphs above, there will be obtained 2-(2'-carboxy-4'-methylphenyl) imidazole hydrochloride.

When this nitroimidazole is used in place of 2-(2'-carboxyphenyl)-4-nitroimidazole in the process of the present example, there is obtained 3-nitro-7(or 8)-methylimidazo-[2,1:a]-isoinodole.

EXAMPLE 2

3,7(or 8)-dinitroimidazo-(2,1:a)-isoindole

To a solution of 15.3 gm. (.0657 mol) of 2-(2'-carboxphonyl)-4-nitroimidazole in 74 ml. 30% fuming sulfuric acid is added 7.5 ml. fuming nitric acid with stirring. After heating at 100° C. for 2¼ hours, the mixture is cooled and poured slowly with stirring into 600 ml. water. The mixture is cooled in ice and the crystalline precipitate which forms is filtered off and washed with water giving 2-(2'-carboxy-4(or 5)-nitrophencyl)-4-nitroimidazole.

The compound, 2-(2'-carboxy-4(or 5)-nitrophenyl)-4-nitroimidazole, is then treated in a manner similar to that method used when preparing 3-nitroimidazole-[2,1:a]-isoindole from 2-(2'-carboxyphenyl)-4-nitroimidazole (Example 1). The product obtained, 3,7(or 8)-dinitroimidazo-[2,1:a]-isoindole, melts with decomposition at 200–240° C.

EXAMPLE 3

3-nitro-5,6-dihydroimidazo-[2,1:a]-isoquinoline 500 mg. (2.1 mmol) of 2-(2'-chloromethylphenyl)-4-nitroimidazole is refluxed for 2 hours in 5 ml. methanol with 103 mg. (2.1 mmol) sodium cyanide. The methanol is removed in vacuo and the residue of crude 2-(2'-cyanomethylphenyl)-4-nitroimidazole is refluxed 4 hours with 5 ml. 25% sulfuric acid. The acid solution is cooled and treated slowly with 2.5 N aqueous sodium hydroxide while stirring and cooling in ice until the pH is about 2. The precipitated crude proudct, 2-(2'-carboxymethylphenyl)-4-nitroimidazole, is recrystallized from ethanol to give substantially pure material.

220 mg. 2-(2'-carboxymethylphenyl)-4-nitroimidazole is dissolved in 5 ml. 1,2-dimethoxyethane and treated with excess gaseous diborane over a period of 20 minutes. The diborane is generated by adding dropwise 7 ml. of 1 M sodium borohydride in 1,2-dimethoxy ethane to 2.3 ml. of boron trifluoride etherate in 5 ml. of 1,2-dimethoxy ethane. The reaction mixture is allowed to stand at room temperature for 1 hour and is diluted carefully with 20 ml. water and 1 ml. 2.5 N hydrochloric acid. The mixture is extracted three times with 25 ml. portions of ethyl acetate and the combined extracts are then dried over sodium sulfate and evaporated to dryness in vacuo. The residual crude 2-[2'-(β-hydroxyethyl)-phenyl]-4-nitroimidazole is recrystallized from ethanol-ether.

150 mg. 2-[2'-(β-hydroxyethyl)-phenyl]-4-nitroimidazole (.64 mmol) is refluxed for 4 hours with 2 ml. of thionyl chloride. The excess thionyl chloride is removed in vacuo and the residue is treated with 5 ml. of water. The resulting mixture is extracted with 3 ml. of chloroform three times and the combined extracts are dried and evaporated in vacuo leaving a residue of crude 2-[2'-(β-chloroethyl)-phenyl]-4-nitroimidazole. This is purified by passage over 1.5 gm. of acid washed alumina using 1:1 ethyl acetate-ether as solvent. The solvent is removed in vacuo and the residue is heated at 200° C. for 20 minutes giving 3-nitro-5,6-dihydroimidazo-[2,1:a]-isoquinoline.

It should be understood that although this invention has been described with reference to particular embodiments thereof, changes and modifications may be made which are within its intended scope and it should be limited only by the language of the appended claims.

What is claimed is:

1. A compound of the formula

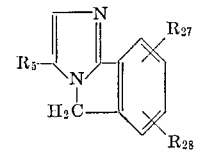

where $R_{27}$ is selected from hydrogen, halogen, nitro, sulfamoyl, and carbamoyl; $R_{28}$ is selected from hydrogen, phenyl, halogen, nitro, sulfamoyl, loweralkylsulfamoyl having 1–2 carbons, diloweralkylsulfamoyl having 1–2 carbons, carbamoyl, loweralkylcarbamoyl having 1–3 carbons, diloweralkylcarbamoyl having 1–2 carbons, loweralkylanoyl having 1–3 carbons, and trifluoromethyl; and $R_5$ is selected from hydrogen or nitro.

2. A compound of claim 1, which compound is 3-nitroimidazo-[2,1:a]-isoindole.

3. A compound of claim 1, which compound is 3-nitro-7(or 8)-carboxamidoimidazo-[2,1:a]-isoindole.

4. A compound of claim 1, which compound is 3-nitro-7(or 8)-fluoroimidazo-[2,1:a]-isoindole.

5. A compound of claim 1, which compound is 3,7(or 8)-dinitroimidazo-[2,1:a]-isoindole.

6. The process for the preparation of a compound of claim 1 of the formula

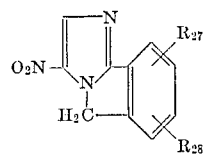

where $R_{27}$ is selected from the group consisting of hydrogen, halo, nitro, sulfamoyl and carbamoyl; and $R_{28}$ is selected from the group consisting of hydrogen, carboxy, phenyl, halo, loweralkylamino having 1–3 carbons, diloweralkylamino having 1–2 carbons, nitro, sulfamoyl, loweralkylsulfamoyl having 1–2 carbons, diloweralkylsulfamoyl having 1–2 carbons, carbamoyl, loweralkylcarbamoyl having 1–3 carbons, diloweralkylcarbamoyl having 1–2 carbons, formyl, loweralkyl having 1–4 carbons, morpholinoloweralkyl having 1–2 carbons, piperidinoloweralkyl having 1–2 carbons, pyrrolidinoloweralkyl having 1–2 carbons, hydroxyloweralkyl having 1–2 carbons, acetylamido, acetylaminoloweralkyl having 1–4 carbons, trifluoromethyl, and loweralkylsulfonyl having 1–2 carbons; which comprises treating a 2-($R_{27}$-$R_{28}$-carboxyphenyl)-5-nitroimidazole having a carboxy group attached to a carbon atom adjacent to a carbon atom in the phenyl ring connecting said ring to the imidazole moiety, with a reducing agent to obtain the corresponding 2-($R_{27}$-$R_{28}$-hydroxymethylphenyl)-5-nitroimidazole, treating said 2-($R_{27}$-$R_{28}$-hydroxymethylphenyl)-5-nitroimidazole with a halogenating agent to obtain the corresponding 2-($R_{27}$-$R_{28}$-halomethylphenyl)-5-nitroimidazole, and heating said 2-($R_{27}$-$R_{28}$-halomethylphenyl)-5-nitroimidazole at a temperature of about 100°–160° C.

7. The process of claim 6 wherein the halogenating agent is thionyl chloride.

No references cited.

ALEX MAZEL, Primary Examiner

J. TOVAR, Assistant Examiner

U.S. Cl. X.R.

260—247.1, 247.2, 247.5, 293, 293.4, 294; 424—273